Sept. 13, 1938.　　　　C. A. KOZA　　　　2,130,094
SPINDLE HEAD
Filed March 30, 1936
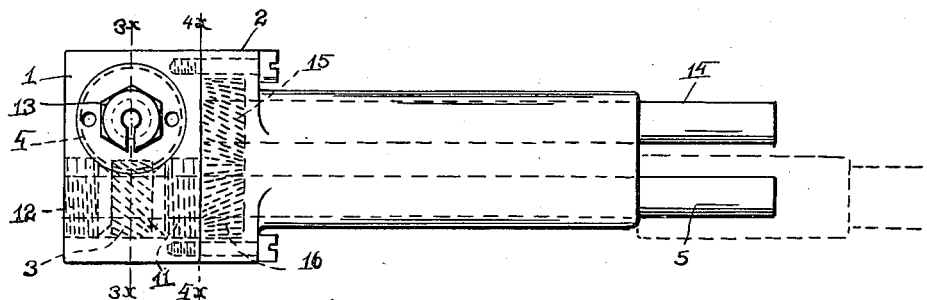
FIG.1.
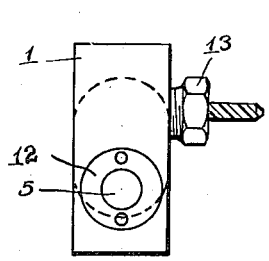　　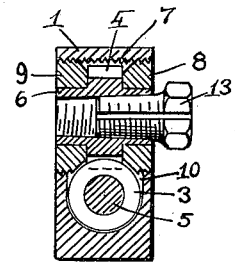　　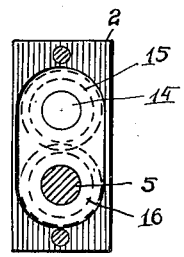
FIG.2.　　　　FIG.3.　　　　FIG.4.
INVENTOR
Charles A. Koza
BY
ATTORNEY Patented Sept. 13, 1938

2,130,094

UNITED STATES PATENT OFFICE 2,130,094

SPINDLE HEAD

Charles A. Koza, Rochester, N. Y.

Application March 30, 1936, Serial No. 71,558

1 Claim. (Cl. 77—7)

This invention relates to spindle heads for performing angular drilling and boring operations in restricted spaces and one of the objects of the invention is to provide a novel construction for such a spindle head so that a drilling operation may be performed with the head in a space of minimum width and at a minimum distance from the end and side wall or other obstruction in the restricted space.

A further object of this invention is to provide a novel driving means for the spindle head.

Another object of this invention is to provide the drill spindle head with novel feeding means for feeding the drill during the drilling operation.

All these and other objects and attendant advantages of this invention will become more readily apparent from the detailed description thereof which follows, reference being had to the accompanying drawing in which Figure 1 is a side elevation of the spindle head embodying my invention.

Figure 2 is an end elevation thereof.

Figure 3 is a vertical section of the spindle head taken on the line 3x—3x of Figure 1.

Figure 4 is a vertical section of the spindle head taken on the line 4x—4x of Figure 1.

In the several figures of the drawing like reference numerals indicate like parts.

The spindle head, forming the subject matter of my present invention is adapted for use in connection with movable power equipment such as portable electric drills, air drills, motor driven flexible shafts etc., and the head and its mechanism is constructed so that otherwise difficult drilling operations may be readily performed therewith. The spindle head is especially useful in repair work as the holes needed for the repair of an object may be drilled without necessitating the removal of the object or the dismantling of it to provide more room for the drilling operation.

As illustrated in the various figures of the drawing, the spindle head comprises the body member 1 and the handle member 2 which are fastened together as illustrated in Figure 1. The body member 1 carries the angle drive, the drill holder and the feeding mechanism, and the handle member, besides furnishing the means for holding and moving the drill head, carries the drive shaft or shafts by means of which the drill is operated. The angle drive comprises the spiral gears 3 and 4 of which gear 3 is carried by the drive shaft 5 and is either keyed thereto or cut as an integral part thereof. Spiral gear 4 is mounted on a sleeve 6 which is preferably an integral part of the gear and projects to either side thereof to provide bearing supports for the gear and at the same time serves as a socket for the drill or its chuck. To make this possible the head member 1 is provided with the hole 7 which extends from one side of the head to the other and is threaded the full length thereof. Into the ends of this hole are threaded the bearing blocks 8 and 9 to provide the bearings for the sleeve 6 and support the gear 4 between them on the inside of the head. The inner ends of the bearing blocks abut against the sides of the spiral gear so that by threading the bearing blocks in either one or the other direction the position of the gear may be adjusted within the head in order to bring it in proper mesh with the spiral gear 3. The latter is mounted in the hole 10 provided thru the head member from end to end at right angles to the hole 7 and suitably spaced from it. Threading the bearing blocks 8 and 9 into the hole 7 also makes it possible to remove them and then reverse the spindle 6 in the hole 7 so as to cause the spiral gear 3 to rotate the spindle in the opposite direction. In this way the angle drill may be used in a minimum space with its spindle rotating in either one or the other direction. It furthermore makes possible the use of both sides of the spindle head for either drilling or tapping operations because the drill or the tap may be made to rotate to the right or left by simply reversing the spindle in the spindle head.

A bearing block 11 surrounds the drive shaft or spindle 5 on one side of the gear 3 and a similar bearing block 12 surrounds the drive shaft or spindle on the other side of the gear and both of these bearing blocks are screwed into the ends of the hole 10 which is threaded for that purpose so as to rotatably support the gear in the hole in mesh with the gear 4. The bearing blocks 11 and 12 abut against the sides of the gear 3 so that it may also be longitudinally adjusted in the hole 10 by threading the bearing blocks in either one or the other direction to bring this gear in proper mesh with the gear 4.

The drive shaft or spindle 5 extends thru the handle member 2 and projects from it to have the coupling of a flexible shaft or any other drive shaft or spindle attached thereto for the operation of the drill head. In order that the drill head can be used to properly rotate a right hand drill for drilling to either the right or the left, it is necessary to provide means whereby the drill can be rotated in both directions. For a drilling operation to the left of the drill head the spiral gear 3 is directly driven by the driving shaft 5 and when rotated in a clockwise direction will rotate the gear 4 in a corresponding clockwise direction for the proper rotation of a right hand drill. For a drilling operation to the right the drive must be reversed because the drill holder or chuck 13 is made so that it can be inserted only into one end of the sleeve 6 of the gear 4 as will hereinafter appear. For this reason it is necessary to turn the drill head 180 degrees in order to have the drill mounted therein drill to the right. Turning the drill head however causes the spiral drive to reverse and in order to have the spiral gear again rotate in a clockwise direction it is necessary to reverse the rotation of the gear 3. This is accomplished by means of a second spindle 14 which is mounted in the handle member 2 parallel to the spindle 5 and is rotatably connected therewith by means of the gear 15 carried thereby so as to mesh with the gear 16 carried by the spindle 5. By connecting the driving power to the second spindle 14 the spindle 5 is thus rotated in the opposite direction to cause the gear 3 to rotate the gear 4 in a clockwise direction with the drill head turned to face the drill to the right. By connecting the driving power to either the shaft 5 or the shaft 14 the drill head may thus be used with a right handed drill to drill either to the right or left by simply turning the drill head to point the drill in the desired direction.

Straight shanked drills are held in the sleeve 6 by means of a chuck 13. This chuck comprises a threaded tapered shank with a hexagon shaped head provided at the outer end thereof. The shank and head are slitted to make them compressible so that the hole which passes thru it is contracted when the shank is compressed. This takes place when the threaded shank is screwed into the sleeve 6 which for this purpose is threaded with a correspondingly tapered thread. Inserting a drill shank into the chuck and threading it into the sleeve will thus clamp the drill in place in the chuck and anchor the chuck into the sleeve for rotation by the spiral gear 4.

As will be seen from an inspection of the figures of the drawing, the drill head is rectangular and has parallel sides, parallel ends and parallel top and bottom with the sides, ends, top, and bottom at right angles to one another. The head may thus be clamped to a flat surface so as to hold its drill at right angles or parallel thereto.

While I have shown and described the spindle head for use in performing drilling operations it is understood that other operations such as grinding, polishing and buffing operations may be performed therewith by simply mounting the supporting spindle or a grinding, polishing and buffing wheel in the sleeve 6 of the spiral gear 4.

I claim:

In a spindle head for angle drills the combination of a body member of rectangular cross section having a pair of threaded holes extending longitudinally and transversely thereof offset from each other, a driving pinion mounted to rotate in said longitudinally extending hole, a hollow spindle, a pinion on said spindle of increased diameter intermediate the ends thereof so as to provide a shoulder on said spindle on each side of said pinion, a bearing member for said spindle on each side of said pinion and abutting against said shoulders, said bearing members being threaded into said transversely extending hole in said body member from opposite sides thereof to center said spindle in reversible positions in said hole to provide for its rotation in opposite directions by the driving pinion and provide for the endwise adjustment of said spindle and its pinion with said bearing members for its driving engagement with said driving pinion.

CHARLES A. KOZA.